April 13, 1948.  C. H. ZIERDT, JR  2,439,405
PULSE COUNTING RELAY SYSTEM
Filed Jan. 14, 1946  2 Sheets-Sheet 1

INVENTOR
CONRAD H. ZIERDT JR.
Harry M. Saragovitz
ATTORNEY

April 13, 1948.  C. H. ZIERDT, JR  2,439,405
PULSE COUNTING RELAY SYSTEM
Filed Jan. 14, 1946   2 Sheets-Sheet 2
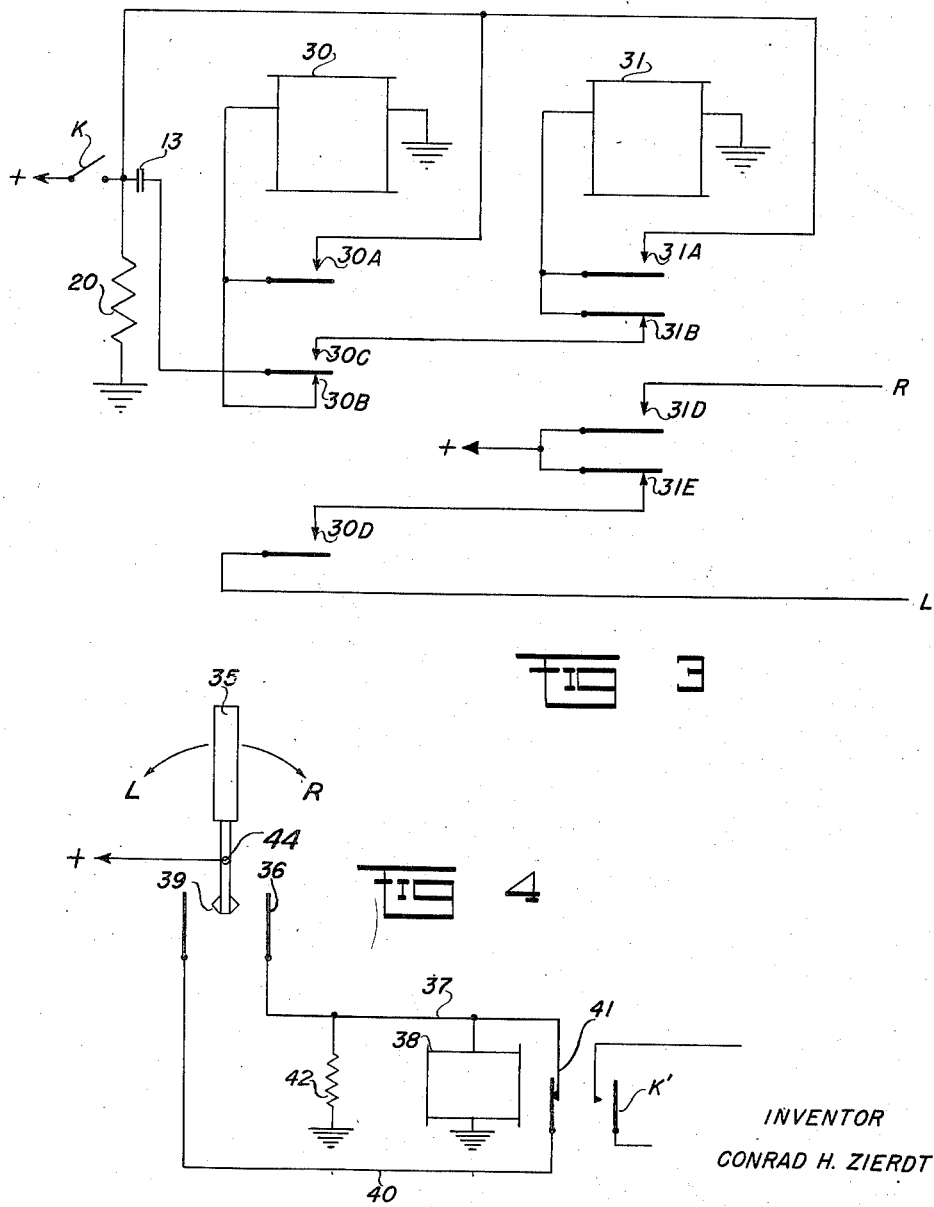
INVENTOR
CONRAD H. ZIERDT JR.
By: William D. Hall
ATTORNEY Patented Apr. 13, 1948

2,439,405

UNITED STATES PATENT OFFICE 2,439,405

PULSE COUNTING RELAY SYSTEM

Conrad H. Zierdt, Jr., Pittsburgh, Pa.

Application January 14, 1946, Serial No. 641,155

4 Claims. (Cl. 175—320)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to relay circuits and particularly to an improved electrical pulse counter.

An object of the invention is to provide a reliable pulse-counting relay circuit of novel and simple construction for enabling a plurality of relays or other electrically operated devices to respond in sequence to a series of electrical pulses. Prior types of pulse counters were subject to many disadvantages, such as causing more than the desired number of relays to be operated on an extended pulse or requiring that relays be provided in addition to the minimum number of pulse-counting relays in order to transfer an operating circuit from one counting relay to the next as the pulse series progressed. The present invention obviates these and other difficulties which have been encountered heretofore.

For a better understanding of the invention, together with other objects thereof, reference is had to the following description taken in connection with the accompanying drawings in which:

Fig. 3 shows still another modified form of the invention; and

Fig. 4 is a wiring diagram of a control circuit adapted to be used with the invention.

Figure 1:
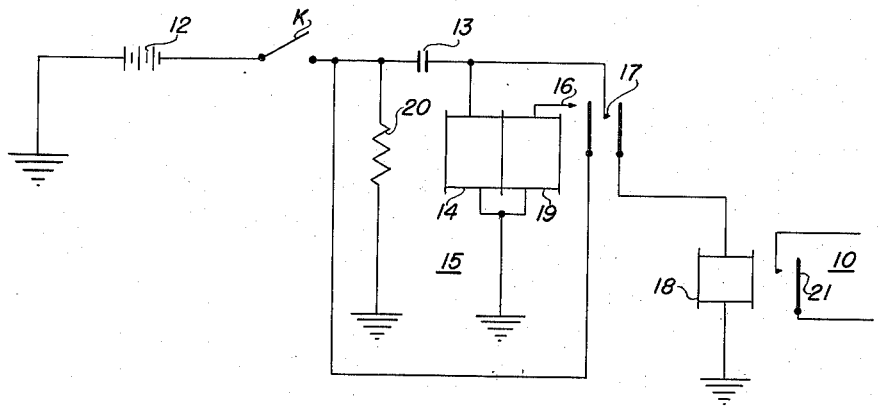
Fig. 1 is a schematic illustration of an elementary form of the invention.

In the embodiment of the invention illustrated in Fig. 1 a control circuit 10 is arranged to be closed in response to the second of two consecutive electrical pulses which are produced by repeated closure of a suitable switch or key K. It will be understood that the principle of operation explained herein may be extended to enable any number of electrical pulses to be counted, but for the present only a two-pulse system will be considered. The key K is connected to the positive terminal of a direct-current voltage source represented by the battery 12, the negative terminal of this voltage being grounded. When key K is closed, a series circuit is established from the source 12 through key K, a capacitor 13 and one winding 14 of a double-wound relay 15 to ground. Relay 15 is energized by the charging current of the capacitor 13 which flows through winding 14. Relay 15 is provided with two "make" contacts 16 and 17 which close when the relay is energized. One terminal of the contact 17 is connected to the junction of capacitor 13 and relay winding 14, the other terminal of this contact being connected through the winding of a relay 18 to ground. Closure of relay contact 17 when relay 15 is operated initially is without effect upon the relay 18 inasmuch as the charging time constant of the capacitor 13 and the operating time of the relay contact 17 are such that the charging current through capacitor 13 will have dropped to a negligible value by the time that the contact 17 closes. Relay 15 is maintained energized for the time being by a holding circuit which extends from source 12 through key K, relay contact 16 and the second winding 19 of relay 15 to ground. A resistor 20 is connected between ground and the high-potential plate of the capacitor 13.

The first closure of key K causes relay 15 to operate but is without effect upon relay 18 for the reason explained above. When key K is released, the capacitor 13, which has been charged to approximately the voltage of the source 12, discharges through the resistor 20 and the windings of relay 15. Some discharge current may also flow through the winding of relay 18 but it will be insufficient to operate this relay. Relay coil 19 likewise discharges through the resistor 20. The resistor 20 determines the amount of delay in the decay of current through winding 19 so that the relay 15 will not drop out during a predetermined interval between pulses.

If key K is now depressed a second time while relay 15 is still held energized, a part of the charging current through capacitor 13 flows through relay contact 17 and winding of relay 18 to ground. Relay 18 operates to close its "make" contact 21, which may be arranged to close the aforementioned control circuit 10. If desired, a suitable holding circuit may be provided, or resort had to any other expedient familiar in the art, to maintain relay 18 operated after the capacitor charging current diminishes.

In the embodiment of the invention illustrated in Fig. 1 it is required that the second pulse occur before the current in the holding coil 19 of the relay 15 decreases below the value necessary to maintain the relay 15 operated, in order that the relay 18 may be operated. In the embodiment shown in Fig. 2 the pulse spacing is not critical, the apparatus functioning to count a plurality of pulses (in this instance, three) irrespective of the spacing between the pulses.

Figure 2:
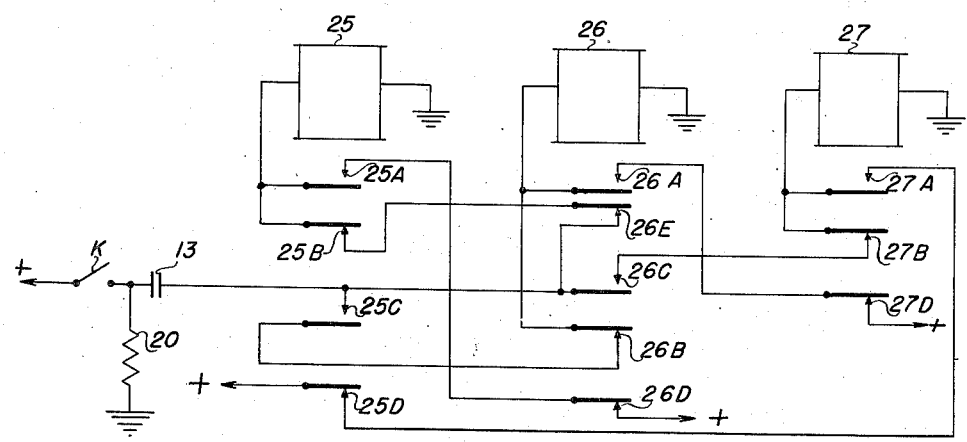
Fig. 2 is a schematic illustration of another embodiment.

Referring now to Fig. 2, wherein it is assumed that the apparatus is arranged to count three consecutive pulses, there are provided three single-coil counting relays 25, 26 and 27. The pulse source may comprise any suitable means such as the key K. As in the case of Fig. 1, a capacitor 13 is connected in series with a relay. The first closure of key K sends a pulse through the capacitor 13, the back contacts 26E and 25B of the relays 26 and 25, respectively, and thence through the winding of relay 25. Relay 25 is energized by this first pulse and closes its "make" contacts 25A and 25C and opens its back contacts 25B and 25D. Closure of relay contact 25A establishes a holding circuit for relay 25, this circuit extending from a suitable voltage source through the back contact 26D of relay 26, relay contact 25A and winding of relay 25. Opening of relay contact 25B breaks the operating circuit for relay 25. Closure of relay contact 25C prepares an operating circuit for counting relay 26. Relay contact 25A is arranged to close after contact 25B opens, while relay contact 25C closes after contact 25A closes. Capacitor 13 charges on the first pulse and blocks the flow of current to relay 26, thus preventing relay 26 from operating during this pulse. The opening of relay contact 25D is without effect, unless counting relay 27 has been locked up from a previous pulse-counting operation, in which event the opening of contact 25D breaks the holding circuit for relay 27.

When the key K is opened to end the first pulse, the capacitor 13 discharges through a suitable discharge circuit such as may be afforded by the resistor 20 which is connected between the high potential plate of capacitor 13 and ground. The discharge path may be completed through the winding of one of the relays as 26 which is in a deenergized condition, but the discharge current will be insufficient to operate such relay.

Relay 25 can remain locked up indefinitely through its holding circuit during the interval between the first and second pulses. As key K is closed to initiate the second pulse, the operating circuit for relay 26 is completed through the discharged capacitor 13, contact 25C of relay 25, back contact 26B of relay 26 and winding of relay 26. Relay 26 operates and closes its contacts 26A and 26C, opening its contacts 26B, 26D, and 26E. Contact 26B opens before contact 26A closes and prior to the closing of contact 26C. Closure of contact 26A completes a holding circuit for relay 26 from contact 27D of relay 27. Opening of contact 26B breaks the operating circuit for relay 26. Closure of contact 26C prepares an operating circuit to relay 27, this being without further effect inasmuch as the charging of capacitor 13 during the second pulse prevents this pulse from being extended to the third counting relay 27. Opening of relay contact 26D interrupts the holding circuit for relay 25, causing this relay to restore. Opening of relay contact 26E prevents the operating circuit for relay 25 from being reestablished. As key K is opened to terminate the second pulse, the capacitor 13 discharges.

The second counting relay 26 remains locked up through its holding circuit between the second and third pulses. When K is closed a third time, a pulse is sent through the capacitor 13, relay contact 26C and the back contact 27B to the winding of relay 27. Relay 27 operates to close its contact 27A and open its contacts 27B and 27D. Inasmuch as relay 27 is the last relay in the chain, it does not have "C" contact for preparing circuit to the next higher counting relay. Likewise, it is not necessary to provide an "E" contact for relay 27 to withhold the operating circuit from the first counting relay 25. Closure of relay contact 27A completes a holding circuit for relay 27 from the back contact 25D of relay 25, which is now in a restored condition. Opening of relay contact 27B subsequent to closure of 27A interrupts the operating circuit for relay 27. Opening of contact 27D interrupts the holding circuit for counting relay 26, which thereupon restores. The restoration of relay 26 is without effect upon relay 25 inasmuch as capacitor 13 prevents the third pulse from being applied to relay 25 through the back contacts 26E and 25B.

Suitable indicator circuits may be provided in association with each of the counting relays 25, 26 and 27, if desired, to furnish an indication of how far the pulse count has progressed. It will be understood that the number of counting relays is arbitrary, three having been selected in the present instance for illustrative purposes only. It is believed that the general scheme of connections is apparent from the description with reference to Fig. 2, in the event that additional relays are to be added.

In Fig. 3 there is shown an arrangement using single-coil counting relays for selecting and closing one of a plurality of control circuits depending upon the number of pulses received. As in the previous embodiments, the pulse source is assumed to comprise a suitable keying device K in conjunction with a direct-current voltage source. In this instance the arrangement is such that one of the two control circuits designated L and R ("left" and "right," respectively) is selectively rendered effective according to whether one or two pulses have been received. In order to operate the R control, the second pulse must be received within a predetermined time interval after the first pulse. Thus, the first pulse sent by key K passes through a capacitor 13 and thence through back contact 30B of the first counting relay 30 to the winding of relay 30. As this relay operates in response to the first pulse, it closes its contacts 30A, 30C and 30D and opens its contact 30B. Contact 30A closes and establishes a holding circuit through key K for relay 30. Contact 30B opens and interrupts the operating circuit for relay 30. The operation of the relay contacts 30A and 30B should be so timed that capacitor 13 is not discharged by these contacts being in closed condition at the same time. As contact 30C closes, it prepares a circuit to the second counting relay 31, the charged condition of capacitor 13 preventing the first pulse from reaching relay 31. As relay contact 30D closes, it completes the L control circuit. Preferably a time relay means (not shown) is provided in the L circuit so that the control operation will not be initiated if a second pulse is received within the predetermined time interval.

When the key K opens to terminate the first pulse, the holding circuit for relay 30 is broken and the coil of relay 30 discharges through a path including a resistor 20 which is connected between the high potential plate of capacitor 13 and ground. This affords a slow release period determined by the amount of resistance in the discharge path. Capacitor 13 likewise discharges in preparation for the following pulse, if any. Relay 31 remains unaffected by the discharging of capacitor 13 and coil 30.

Closure of key K within the release period of relay 30, following the discharge of capacitor 13, causes a second pulse to be sent through the capacitor 13, relay contact 30C, and back contact 31B to the winding of relay 31, which thereupon operates. Contact 31A closes to complete a holding circuit for relay 31 through the key K. Contact 31B opens to break the operating circuit for relay 31. Relay contact 31D closes the R control circuit. Relay contact 31E opens and interrupts the L control circuit. Following the second pulse, the relay coils 30 and 31 and capacitor 13 discharge.

Where the pulse-counting circuit such as illustrated in Fig. 3 is to be used in a remote control system, the key K or its equivalent is located in the transmitter and the balance of the circuit is in the receiver of the system. A convenient pulse-generating circuit to replace the key K in the transmitter is shown in Fig. 4. A control stick 35, which swings about the pivot point 44, as indicated by the arrows is moved by the operator to L or R position as desired. In the L position of the control stick 35 it closes a switch 36, applying battery on a conductor 37 to which the winding of a relay 38 is connected. Relay 38 energizes and closes a keying contact K' to send a single pulse. It will be recalled than an R signal comprises two consecutive pulses. When the control stick 35 is in the R position, it closes a switch 39 and applies battery to a conductor 40 which leads to one terminal of a back contact 41 on the relay 38, the other terminal of this contact 41 being connected to the conductor 37. The relay contact 41 has a thin, long-motion spring which delays the opening of contact 41 as relay 38 is energized. When relay 38 operates, it closes the keying contact K' to send out the first pulse; then, as contact 41 opens, the operating circuit to relay 38 is broken and the coil of this relay discharges through a resistor 42. Relay 38 restores after a predetermined interval, opening the keying contact K' to end the first pulse and closing the contact 41. Assuming that the control stick 35 is maintained in its R position, relay 38 is again energized and operates to open contact 41 and close contact K', causing the second pulse to be transmitted. So long as control stick 35 is in the R position, relay 38 continues to operate and restore, sending accurately timed pulses to the counting relay circuit at the receiver. Where only two pulses are required, as in the present instance, the sending of any additional pulses is superfluous.

Among the features of the invention it will be noted that only one "make" contact, i. e., key K or its equivalent, is required to successively operate the counting relays. The number of relays is kept to a minimum, only as many counting relays being required as there are pulses to be counted. No extra relays are needed for transferring the operating circuit from one counting relay to the next. An extended pulse has no different effect upon the pulse counter than a pulse of normal length, only one relay being operated for each pulse received. Spacing between pulses can be critical or not, as desired. Fig. 2, for example, illustrates an arrangement in which pulse spacing is not critical.

While there have been described what are at present considered to be the preferred embodiments of this invention, it will be obvious to those skilled in the art that various changes and modifications may be made therein without departing from the scope of the invention.

The invention claimed is:

1. In combination with a source of electrical pulses and an electrically operable device, a relay, a capacitor, a make contact on said relay, means connecting said capacitor and said relay in series with said pulse source, means including said make contact connecting said capacitor and said electrically operable device in series with said pulse source, means for maintaining said contact operated for at least a predetermined time following an initial pulse to said relay, and means for discharging said capacitor following said initial pulse, said capacitor preventing energization of said electrically operable device by said initial pulse and permitting energization of said device in response to a second pulse occurring while said contact is operated.

2. A pulse-counting apparatus comprising; a direct-current voltage source, a keying device in series with said source, a relay having two windings, a first and second make contact, a capacitor, a resistor, an electrical device connected to said first make contact, an operating circuit for said relay wherein said source, keying device, capacitor, and one winding of the relay are connected in series, a first holding circuit for said relay wherein said source, keying device, first make contact, and the other winding of the relay are connected in series, a second holding circuit for said relay wherein said two windings of the relay and first make contact are connected in series, said second holding circuit being adapted to discharge the capacitor, an operating circuit for said electrical device wherein said electrical device, source, keying device, capacitor, and second make contact are connected in series, whereby, upon closing of the keying device, a first pulse causes operation of the operating circuit so as to energize said relay, whereupon the first holding circuit maintains such energization of said first relay during the balance of said first pulse, and upon opening of said keying device the capacitor discharges and the second holding circuit for said relay continues said relay in energized condition, and, upon a reclosing of said keying device, a second pulse causes operation of the electrical device.

3. A pulse-counting apparatus comprising; a direct-current voltage source, a keying device in series with said source, a first relay having first and second make contacts and first and second break contacts, a second relay having third and fourth make contacts and third, fourth and fifth break contacts, a third relay having fifth make contact and sixth and seventh break contacts, a capacitor, a resistor, an operating circuit for said first relay wherein said source, keying device, capacitor, first break contact, third break contact and first relay are connected in series, a first holding circuit for said first relay wherein said source, second make contact, fifth break contact and first relay are connected in series, means to discharge the capacitor during operation of the first holding circuit for said first relay, an operating circuit for said second relay, wherein said source, keying device, capacitor, first make contact, fourth break contact and second relay are connected in series, a second holding circuit for said second relay wherein said source, third make contact, seventh break contact and second relay are connected in series, means to discharge the capacitor during operation of the second holding circuit for said second relay, an operating circuit for said third relay wherein said source, keying device, capacitor, fourth make contact, sixth break contact, and third relay are connected in series, a third holding circuit for said third relay wherein said source, fifth make contact, a second break contact, and third relay are connected in series, means to discharge the capacitor during operation of the third holding circuit for said third relay, whereby upon closing of the keying device a first pulse causes operation of the operating circuit for the first relay, so as to energize said first relay, whereupon the first holding circuit for said first relay maintains such energization of said first relay during the interval between first and second pulses, and upon opening of said keying device, the capacitor discharges, and upon a reclosing of said keying device a second pulse causes operation of the operating circuit of said second relay so as to energize said second relay, whereupon the second holding circuit of said second relay maintains such energization of said second relay during the interval between second and third pulses, and upon opening of said keying device the second time, the capacitor discharges, and upon a second reclosing of said keying device a third pulse causes operation of the operating circuit of said third relay so as to energize said third relay, whereupon the third holding circuit of said third relay maintains such energization of said third relay during the interval following the third pulse, and upon opening the keying device the capacitor discharges.

4. A pulse-counting apparatus comprising; a direct-current voltage source, a keying device in series with said source, a first relay having first, second and third make contacts and a first break contact, a second relay having fourth and fifth make contacts and second and third break contacts, a capacitor, a resistor, an operating circuit for said first relay, wherein said source, keying device, capacitor, first break contact and first relay are connected in series, a first holding circuit for said first relay, wherein said source, keying device, second make contact and first relay are connected in series, a second holding circuit for said first relay, wherein said first relay, second make contact and resistor are connected in series, means to discharge the capacitor during operation of the second holding circuit of said first relay, an operating circuit for said second relay, wherein said second relay, source, keying device, capacitor, first make contact, second break contact, and second relay are connected in series, a first holding circuit for said second relay wherein said source, keying device, fourth make contact and second relay are connected in series, a second holding circuit for said second relay, wherein said second relay, fourth make contact and resistor are connected in series, means to discharge the capacitor during operation of the second holding circuit for the second relay, a first control circuit including said third make contact and said third break contact, and a second control circuit including said fifth make contact, whereby, upon closing of the keying device a first pulse causes operation of the operating circuit for the first relay so as to energize said first relay, whereupon the first holding circuit for said first relay maintains such energization of said first relay during the balance of said first pulse and, upon opening of said keying device, the capacitor discharges and the second holding circuit for said first relay continues said first relay in energized condition, and, upon a reclosing of said keying device, a second pulse causes operation of the operating circuit for said second relay so as to energize said second relay, whereupon the first holding circuit for said second relay maintains such energization of said second relay during the balance of said second pulse, and, upon a second opening of said keying device, the capacitor again discharges and the second holding circuit for said second relay continues said second relay in energized condition.

CONRAD H. ZIERDT, Jr.

REFERENCES CITED

The following references are of record in the file of this patent:

UNITED STATES PATENTS

| Number | Name | Date |
|---|---|---|
| 1,811,858 | Miller | June 30, 1931 |
| 2,208,125 | Feingold | July 16, 1940 |
| 2,277,579 | Burger | Mar. 24, 1942 |

FOREIGN PATENTS

| Number | Country | Date |
|---|---|---|
| 557,852 | Great Britain | Dec. 8, 1943 |